US009691315B2

United States Patent
Imai et al.

(10) Patent No.: US 9,691,315 B2
(45) Date of Patent: Jun. 27, 2017

(54) TOUCH-TYPE INPUT DEVICE

(71) Applicants: KABUSHIKI KAISHA TOKAI RIKA DENKI SEISAKUSHO, Aichi (JP); TOYOTA JIDOSHA KABUSHIKI KAISHA, Aichi-ken (JP); SMK CORPORATION, Tokyo (JP)

(72) Inventors: Takao Imai, Aichi (JP); Toru Ueno, Aichi (JP); Keiji Murase, Aichi (JP); Yuji Takai, Aichi (JP); Hiroki Noritake, Aichi (JP); Hiroshi Shikata, Nisshin (JP); Naoki Kamiya, Aichi (JP); Osamu Yoshikawa, Tokyo (JP)

(73) Assignees: KABUSHIKI KAISHA TOKAI RIKA DENKI SEISAKUSHO, Aichi (JP); TOYOTA JIDOSHA KABUSHIKI KAISHA, Aichi-Ken (JP); SMK CORPORATION, Tokyo (JP)

( * ) Notice: Subject to any disclaimer, the term of this patent is extended or adjusted under 35 U.S.C. 154(b) by 43 days.

(21) Appl. No.: 14/746,936

(22) Filed: Jun. 23, 2015

(65) Prior Publication Data
US 2015/0379914 A1 Dec. 31, 2015

(30) Foreign Application Priority Data

Jun. 26, 2014 (JP) .................. 2014-131710

(51) Int. Cl.
*G09G 3/20* (2006.01)
*G06F 3/041* (2006.01)
*G06F 3/044* (2006.01)

(52) U.S. Cl.
CPC ............... *G09G 3/20* (2013.01); *G06F 3/044* (2013.01); *G06F 3/0418* (2013.01);
(Continued)

(58) Field of Classification Search
CPC .. G09G 3/20; G09G 2354/00; G09G 2380/10; G06F 3/0418; G06F 3/044; G06F 2203/04104
See application file for complete search history.

(56) References Cited

U.S. PATENT DOCUMENTS

2011/0012840 A1* 1/2011 Hotelling .............. G06F 3/0418
345/173
2012/0249470 A1* 10/2012 Sugiura ................. G06F 1/1694
345/174
(Continued)

FOREIGN PATENT DOCUMENTS

JP 2010-009321 1/2010
JP 2012-098827 5/2012
(Continued)

OTHER PUBLICATIONS

European Search Report, mailed Oct. 20, 2015 with respect to European Patent Application No. 15173280.7.
(Continued)

*Primary Examiner* — Lun-Yi Lao
*Assistant Examiner* — Kelly Hegarty
(74) *Attorney, Agent, or Firm* — Greenblum & Bernstein, P.L.C.

(57) ABSTRACT

A touch-type input device includes a touch panel including drive electrodes and sensor electrodes. Capacitors are formed at intersections of the drive electrodes and sensor electrodes. A controller determines whether a conductive foreign matter exists on the touch panel from raw data values indicating changes in the capacitances of the capacitors from initial reference values. The controller determines touching of the touch panel from control data values indicating changes in the capacitances of the capacitors from control reference values changed when a conductive foreign matter exists. When the raw data values indicate existence of a
(Continued)

conductive foreign matter, the controller sets the control reference value of each capacitor to a raw data reference value corresponding to the present raw data value. The controller updates the initial reference value when the touch-type input device is activated and updates the control reference value when the control reference value is erroneous.

1 Claim, 7 Drawing Sheets

(52) U.S. Cl.
CPC .............. *G06F 2203/04104* (2013.01); *G09G 2354/00* (2013.01); *G09G 2380/10* (2013.01)

(56) References Cited

U.S. PATENT DOCUMENTS

| 2012/0293447 A1 | 11/2012 | Heng et al. | |
|---|---|---|---|
| 2013/0038573 A1 | 2/2013 | Chang et al. | |
| 2013/0176268 A1* | 7/2013 | Li | G06F 3/044 |
| | | | 345/174 |
| 2013/0207935 A1* | 8/2013 | Toda | G06F 3/044 |
| | | | 345/174 |
| 2014/0062947 A1 | 3/2014 | Zhou et al. | |
| 2014/0092033 A1 | 4/2014 | Chang et al. | |
| 2014/0139478 A1* | 5/2014 | Lee | G06F 3/044 |
| | | | 345/174 |
| 2014/0160038 A1 | 6/2014 | Lee et al. | |
| 2015/0077388 A1* | 3/2015 | Liao | G06F 3/0418 |
| | | | 345/174 |
| 2015/0138132 A1* | 5/2015 | Park | G06F 3/0418 |
| | | | 345/174 |

FOREIGN PATENT DOCUMENTS

| JP | 2012-150747 | 8/2012 |
|---|---|---|
| JP | 4994489 | 8/2012 |
| JP | 2013-030120 | 2/2013 |
| JP | 2013-114472 | 6/2013 |
| JP | 2014-049137 | 3/2014 |

OTHER PUBLICATIONS

Office Action issued in Japan Patent Appl. No. JP 2014-131710 dated May 10, 2016, along with an English translation thereof.

* cited by examiner

TOUCH-TYPE INPUT DEVICE

CROSS-REFERENCE TO RELATED APPLICATIONS

This application is based upon and claims the benefit of priority from prior Japanese Patent Application No. 2014-131710, filed on Jun. 26, 2014, the entire contents of which are incorporated herein by reference.

FIELD

The present invention relates to a touch-type input device.

BACKGROUND

Japanese Laid-Open Patent Publication No. 2010-9321 describes a touch-type input device including a touch panel that is touched to operate virtual buttons shown on a display. In the touch-type input device, for example, a user touches an operation surface of the touch panel to select one of a plurality of functional items presented on the display. This allows the user to view the desired interface on the display or operate an onboard device. Such touching of the touch panel includes, in addition to a simple touch of the operation surface, swiping or flicking of the operation surface in which a finger is moved along the operation surface in a single direction. By swiping or flicking the operation surface, the interface shown on the display is scrolled.

Such a touch panel may implement projected capacitive technology. A projected capacitance type touch panel includes drive electrodes and sensor electrodes that are arranged in a grid-shaped pattern. Capacitors are formed at the intersecting points of the drive electrodes and the sensor electrodes. Touching of the touch panel is detected from the capacitance of each capacitor. A mutual capacitance type touch panel detects a touched position based on changes in the capacitance of each capacitor. The mutual capacitance type touch panel is advantageous in that a number of touch positions may be simultaneously detected.

A conductive foreign matter such as a water droplet or a coin may contact or collect on the operation surface of the touch panel. The contact of such a foreign matter needs to be distinguished from a finger that touches the operation surface. In a mutual capacitance type touch panel, when a finger contacts the operation surface, the capacitance of each capacitor in the area touched by the finger changes from a reference value (zero), which corresponds to a condition in which there is no object contacting the operation surface, toward a first polarity side (e.g., positive). In contrast, when a foreign matter contacts the operation surface, the capacitance of each capacitor in the area that is in contact with the foreign matter changes toward a second polarity side (e.g., negative). Japanese Patent No. 4994489 describes a touch-type input device that takes this into consideration. The touch-type input device computes the distribution of the amount of change in capacitance of the capacitors. When the peak value of the changed amount distribution is less than or equal to a predetermined negative threshold value, the touch-type input device determines that a foreign matter is contacting the operation surface.

SUMMARY

When a conductive foreign matter is left in contact with the operation surface of the touch panel, each capacitor in the area contacting the foreign matter remains changed from the reference value. Thus, it becomes difficult to correctly detect touching of the touch panel. In addition to contact with a foreign matter, the ambient environment, such as the temperature, or wear may change the electrostatic capacitance (parasitic capacitance) from the reference value. It would also be difficult to correctly detect touching of the touch panel in such a case.

One aspect of the present invention is a touch-type input device including a touch panel and a controller. The touch panel includes a sensor array and an operation surface. The sensor array includes drive electrodes and sensor electrodes insulated from and stacked on the drive electrodes. The drive electrodes and the sensor electrodes are arranged in a grid-shaped pattern that forms capacitors at intersections of the drive electrodes and the sensor electrodes. The controller applies a drive signal to the drive electrodes and detects touching of the operation surface of the touch panel from changes in a capacitance of each capacitor. The controller determines whether or not a conductive foreign matter exists on the operation surface from raw data values, each indicating a change amount in the capacitance of each capacitor from an initial reference value that is set in advance for each capacitor. The controller determines whether or not the operation surface has been touched from control data values, each indicating a change amount in the capacitance of each capacitor from a control reference value that is changed for each capacitor in accordance with whether or not the conductive foreign matter exists. When the controller determines from the raw data values that the conductive foreign matter exists on the operation surface, the controller sets the control reference value of each capacitor to a raw data reference value corresponding to the present raw data value. When the controller determines from the raw data values that the conductive foreign matter does not exist on the operation surface, the controller sets the control reference value of each capacitor to the initial reference value. The controller updates the initial reference value, when the touch-type input device is activated, to correctly determine whether or not the operation surface has been touched. The controller updates the control reference value when determining that the control reference value is erroneous.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DESCRIPTION OF THE EMBODIMENTS

First Embodiment

A first embodiment of a touch-type input device will now be described with reference to FIGS. 1 to 10C.

Figure 1:
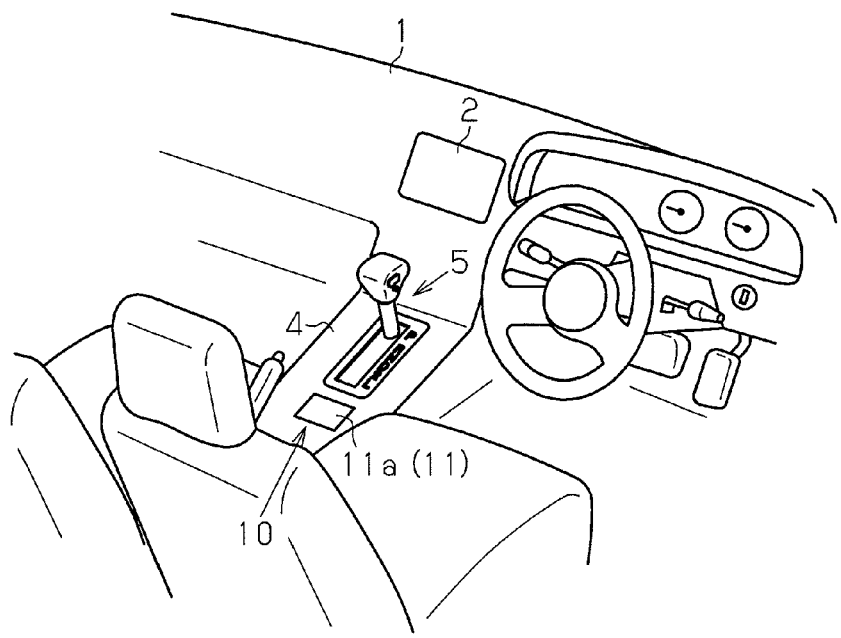
FIG. 1 is a perspective view showing a touch-type input device installed in a vehicle.

Referring to FIG. 1, a dashboard 1 includes a central portion (center cluster) where a display 2 is set. A center console 4 includes a shift lever 5 and a touch-type input device 10. The touch-type input device 10 includes a touch panel 11 that is set on the center console 4 at the rear side of the shift lever 5. The touch panel 11 includes an operation surface 11a. In the first embodiment, the touch-type input device 10 is installed in a vehicle but may be installed in other machines. A user touches the operation surface 11a of the touch panel 11 with a conductor, such as a finger or a stylus, to select the desired functional item shown on the display 2 and accordingly operate an onboard device, such as an air conditioner or a car navigation system. Touching of the touch panel 11 includes, in addition to a simple touch of the operation surface 11a, swiping or flicking of the operation surface 11a in which a finger is moved along the operation surface in a single direction.

Figure 2:
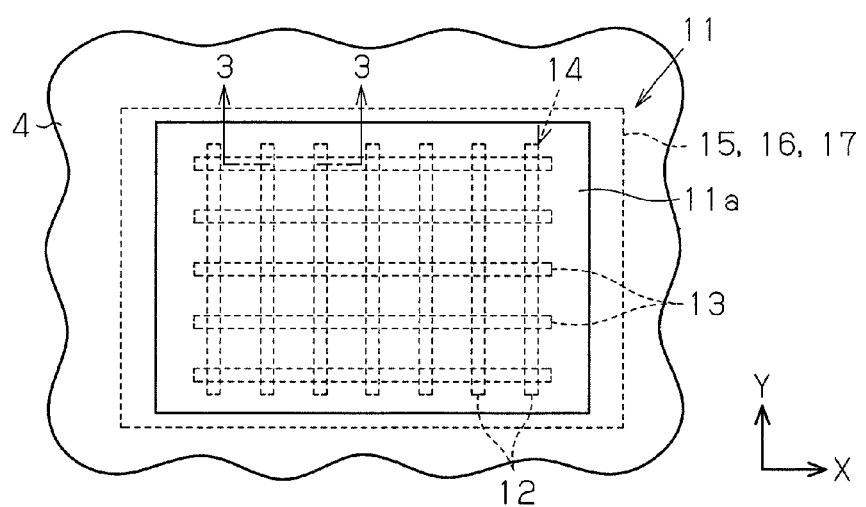
FIG. 2 is a plan view showing an operation surface of a touch panel in the touch-type input device.

As shown in FIG. 2, the touch panel 11 includes a sensor array 14. The sensor array 14 includes drive electrodes 12 and sensor electrodes 13, which are stacked on and insulated from the drive electrodes 12. The drive electrodes 12 and the sensor electrodes 13 are arranged in a grid-shaped pattern that forms capacitors at the intersections of the drive electrodes 12 and the sensor electrodes 13. For the sake of brevity, FIG. 2 shows only seven of the drive electrodes 12 and five of the sensor electrodes 13.

Figure 3:
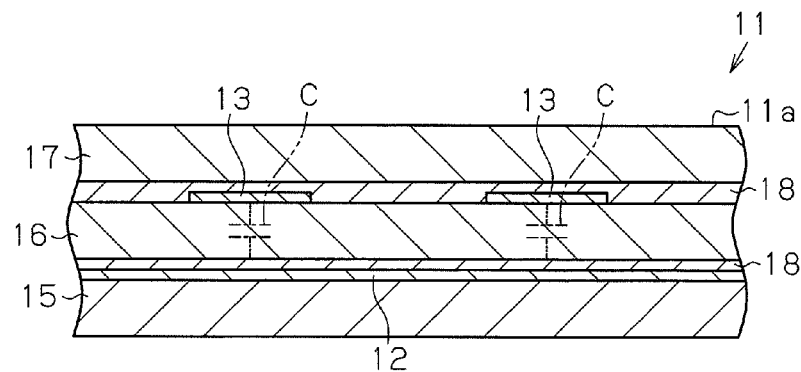
FIG. 3 is a cross-sectional view taken along line 3-3 in FIG. 2.

Referring to FIG. 3, the drive electrodes 12 are arranged on a drive substrate 15. The sensor electrodes 13 are arranged on a sensor substrate 16, which is stacked on the drive substrate 15. A cover 17 is set on the sensor substrate 16. The drive substrate 15, the sensor substrate 16, and the cover 17 are each formed from an insulative material. The cover 17 includes an upper surface that partially forms the operation surface 11a of the touch panel 11.

The drive electrodes 12 and the sensor electrodes 13 are each formed from strips of a conductive material. The drive electrodes 12 are arranged adjacent and parallel to one another in a first direction (X direction) within the area of the drive substrate 15 that corresponds to the operation surface 11a. The sensor electrodes 13 are arranged adjacent and parallel to one another in a second direction (Y direction), which is orthogonal to the first direction, within the area of the sensor substrate 16 that corresponds to the operation surface 11a. Consequently, the drive electrodes 12 and sensor electrodes 13 form the sensor array 14, which has a grid-shaped pattern, in the operation surface 11a. Further, as shown by the broken lines in FIG. 3, the intersections of the drive electrodes 12 and the sensor electrodes 13 form capacitors C. In the first embodiment, an adhesive agent 18 is used to fix the drive electrodes 12 to the drive substrate 15 and the sensor electrodes 13 to the sensor substrate 16.

Figure 4:
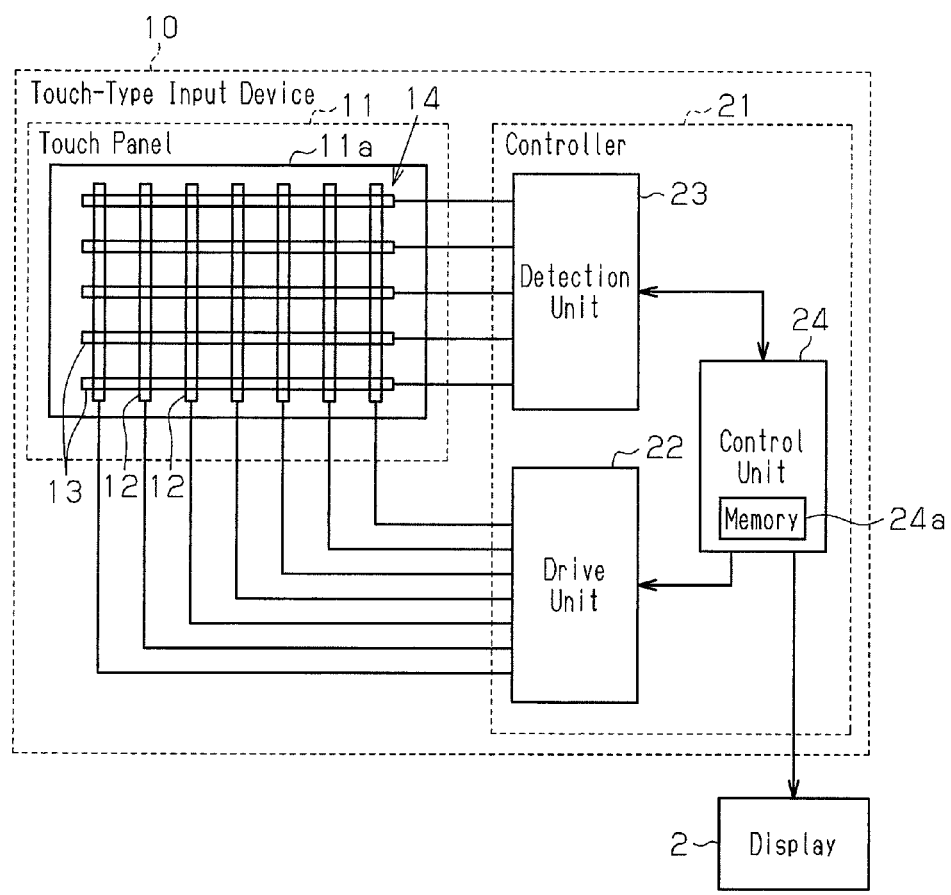
FIG. 4 is a schematic block diagram of the touch-type input device.

As shown in FIG. 4, the touch-type input device 10 further includes a controller 21 that applies a drive signal (pulse signal) to the sensor array 14 to detect a touch, that is, touching of the operation surface 11a of the touch panel 11. The controller 21 of the first embodiment employs the mutual capacitance technology and detects a touched position based on a charge-discharge current generated when the capacitance of each capacitor C changes.

The controller 21 includes a drive unit 22, which is connected to the drive electrodes 12, a detection unit 23, which is connected to the sensor electrodes 13, and a control unit 24, which controls the drive unit 22 and the detection unit 23. The drive unit 22 selects the drive electrodes 12 at least one at a time in response to a control signal from the control unit 24 and applies a drive signal to the selected drive electrode 12. The detection unit 23 selects the sensor electrodes 13 at least one at a time in response to control signals from the control unit 24 to receive the charge-discharge current flowing through the selected electrode 13 as an output signal in accordance with the drive signal applied to the selected drive electrode 12. Further, the detection unit 23 detects the capacitance of each capacitor C based on the output signal from the corresponding sensor electrode 13 and outputs a detection signal, which indicates a detection value of the capacitance of the capacitor C, to the control unit 24. Then, the control unit 24 detects a touch and a touched position (coordinates) from the detection signal and outputs the detection result to the display 2.

The control unit 24 is capable of detecting a touch even when a conductive foreign matter, such as a water droplet or a coin, is contacting the operation surface 11a. In the first embodiment, the capacitance changes toward the positive side when a finger or the like contacts the operation surface 11a, and the capacitance changes toward the negative side when a conductive foreign matter contacts the operation surface 11a.

The control unit 24 includes a memory 24a. The memory 24a stores an initial reference value, which is set in advance for each capacitor C. The initial reference value is the electrostatic capacitance when there is no object contacting the operation surface 11a. That is, the initial reference value is set to 0 (zero). However, wear or the ambient environment, such as the temperature, may change the electrostatic capacitance (parasitic capacitance) of each capacitor C. It is thus preferred that the initial reference value be updated. For example, when the touch-type input device 10 is activated, the initial reference value of each capacitor C may be updated in accordance with changes in the capacitance caused by wear or the ambient environment. Thus, the memory 24a stores a control reference value for each capacitor C. In accordance with whether or not a foreign matter exists on the touch panel 11, the control reference value of each capacitor C is set to the initial reference value or changed to a reference value that is set based on the detection value of the capacitance output from the detection unit 23. However, an erroneous control reference value may be obtained. Further, the control reference value may not be correctly changed. In the first embodiment, the control unit 24 determines whether there is an abnormality (error) in the control reference value and updates the control reference value when there is an error.

When the control unit 24 obtains the capacitance (detection signal) of each capacitor C from the detection unit 23, the control unit 24 determines whether or not a conductive foreign matter exists on the touch panel 11, that is, whether or not a foreign matter is contacting the operation surface 11*a* based on raw data values, each indicating the change amount of the capacitance of each capacitor C from the initial reference value. For example, the control unit 24 determines the existence of a foreign matter when at least one of the raw data values is less than or equal to a foreign matter determination threshold value. The foreign matter determination threshold value is set to a predetermined negative value. When the control unit 24 determines from the raw data values that a foreign matter exists on the touch panel 11, the control unit 24 acquires the capacitance (detection signal) of each capacitor C again from the detection unit 23. Then, the control unit 24 determines from control data values, each indicating the change amount of the capacitance of each capacitor C from the corresponding control reference value, whether or not another conductive foreign matter exists on the touch panel 11, that is, whether or not another foreign matter is contacting the operation surface 11*a*. For example, the control unit 24 determines the existence of a foreign material when at least one of the control data values is less than or equal to the foreign matter determination threshold value. Further, the control unit 24 determines whether or not the touch panel 11 has been touched based on the control data values. For example, the control unit 24 determines that the touch panel 11 has been touched when at least one of the control data values is greater than or equal to a touch determination threshold value. The touch determination threshold value is set to a predetermined positive value. The control unit 24 may also determine that the touch panel 11 has been touched based on the raw data values.

When the control unit 24 determines from the raw data values that a foreign matter exists on the operation surface 11*a*, the control unit 24 sets the control reference value for each capacitor C to the same value as the capacitance corresponding to the present raw data value (hereafter, referred to as the raw data reference value). When the control reference value is set to the raw data reference value corresponding to the raw data for each capacitor C, the control unit 24 assumes that the capacitance for each capacitor C is zero (0) under a situation in which the foreign matter is in contact with the operation surface 11*a*. Then, the control unit 24 acquires new control data values indicating the change amounts in the capacitances of the capacitors C from the corresponding control reference values. When the control unit 24 determines from the raw data values that there is no foreign matter on the operation surface 11*a*, the control unit 24 sets the control reference value of each capacitor C to the initial reference value.

Further, when the control unit 24 determines from the control data values that a foreign matter exists on the operation surface 11*a*, the control unit 24 sets a new control reference value for each capacitor C to the same value as the capacitance corresponding to the present control data value (hereafter, referred to as the control data reference value). When the control reference value is set to the control data reference value corresponding to the control data value of each capacitor C, the control unit 24 assumes that the capacitance for each capacitor C is zero (0) under a situation in which a foreign matter is in contact with the operation surface 11*a*. Then, the control unit 24 acquires new control data values indicating the change amounts in the capacitances of the capacitors C from the corresponding new control reference values. When the control unit 24 determines from the control data values that there is no foreign matter on the operation surface 11*a*, the control unit 24 sets a new control reference value for each capacitor C to the corresponding raw data reference value.

The shifting of operational states in the touch-type input device 10 will now be described with reference to FIG. 5.

Figure 5:
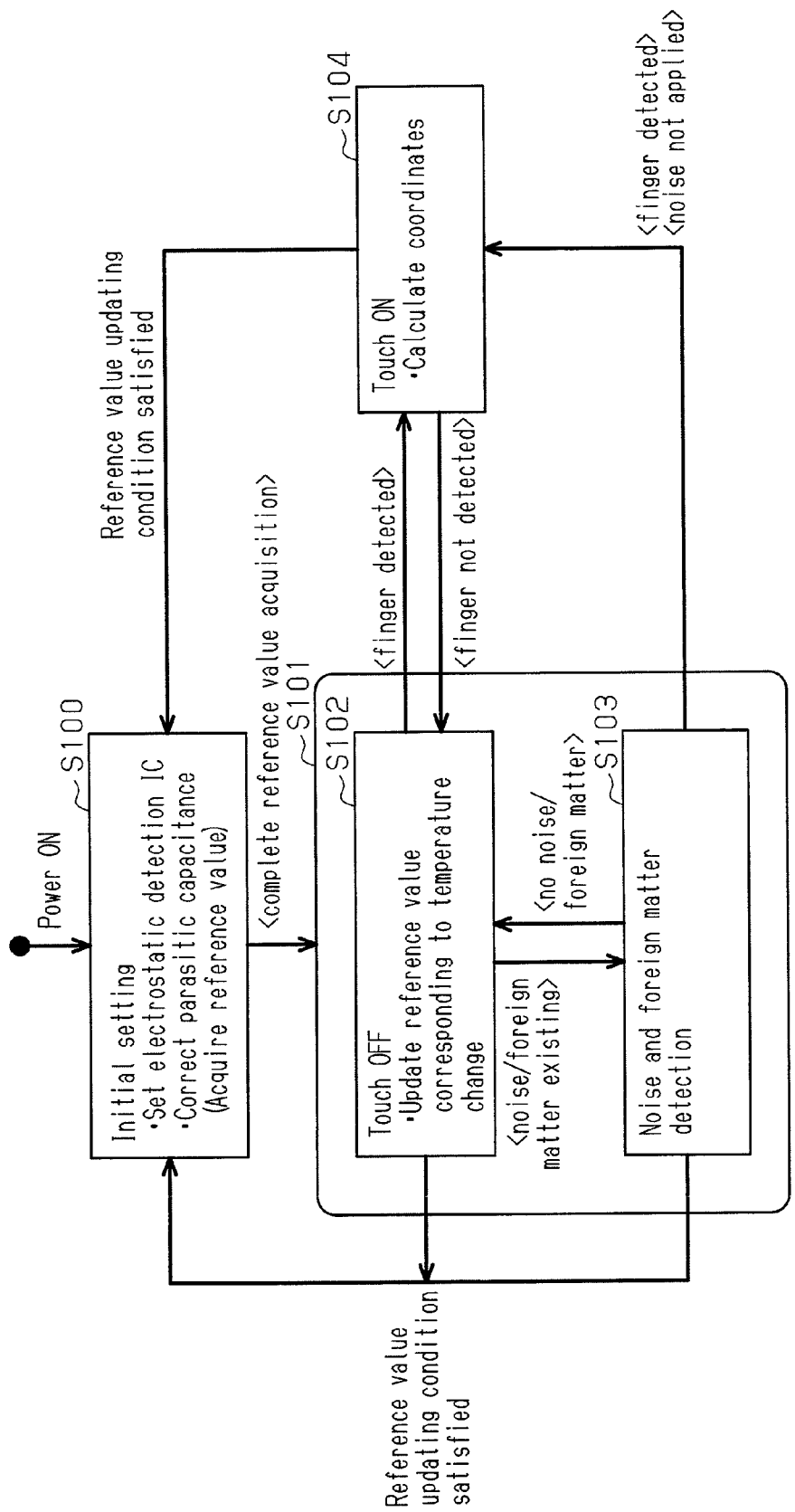
FIG. 5 is a schematic diagram showing the shifting of operational states in the touch-type input device of FIG. 1.

As shown in FIG. 5, when the power goes ON and the touch-type input device 10 is activated, the controller 21 shifts to an initial setting state (step S100). In the initial setting state, the control unit 24 of the controller 21 sets an electrostatic detection IC (detection unit 23) and corrects the parasitic capacitance (change in capacitance) of each capacitor C. That is, the control unit 24 acquires the present capacitance of each capacitor C as the reference value (initial reference value or control reference value). When the acquisition of the reference value is completed, the controller 21 shifts to a detection standby state and waits for the detection of touching of the operation surface 11*a* (step S101).

In a touch OFF state (step S102) in which the operation surface 11*a* is not touched, the control unit 24 performs the detection of noise and foreign matter and the detection of a touch. The capacitance of each capacitor C is changed by the temperature of the ambient environment. Accordingly, in the touch OFF state, the control unit 24 updates the reference value (initial reference value or control reference value) to a value corresponding to the temperature change. Then, when determining from the raw data values that a foreign matter exists on the operation surface 11*a*, the control unit 24 shifts to a noise and foreign matter detection state (step S103). In the noise and foreign matter detection state, the control unit 24 determines from the control data values indicating the change amounts of the capacitances of the capacitors C from the corresponding control reference values whether or not a conductive foreign matter exists, that is, whether or not another foreign matter is contacting the operation surface 11*a*. When determining that there is no foreign matter, the control unit 24 shifts to a touch OFF state (step S102).

In the touch OFF state (step S102), when the control unit 24 determines that the operation surface 11*a* is being touched from the control data values, the control unit 24 shifts to a touch ON state (step S104). Then, the control unit 24 obtains the coordinates of the location where the operation surface 11*a* has been touched and outputs the coordinates to the display 2.

In the noise and foreign matter detection state (step S103), while detecting the existence of a foreign matter, when the control unit 24 determines that the operation surface 11*a* has been touched from the control data values, the control unit 24 shifts to the touch ON state (step S104). Then, the control unit 24 obtains the coordinates of the location where the operation surface 11*a* has been touched and outputs the coordinates to the display 2.

The control unit 24 shifts to the initial setting state (step S100) when a reference value updating condition is satisfied in any one of the touch OFF state (step S102), the noise and foreign matter detection state (step S103), and the touch ON state (step S104). The reference value updating condition is the determination of an error in the reference values. For example, in the first embodiment, when a situation in which the width of fluctuations in the raw data values or the control data values is within a predetermined range W continues for a predetermined time T, the control unit 24 determines that the reference value updating condition has been satisfied.

The procedures taken by the control unit 24 to update the reference values will now be described with reference to FIG. 6. The control unit 24 determines whether or not the reference values need to be updated in each of the touch OFF state (step S102), the noise and foreign matter detection state (step S103), and the touch ON state (step S104).

Figure 6:
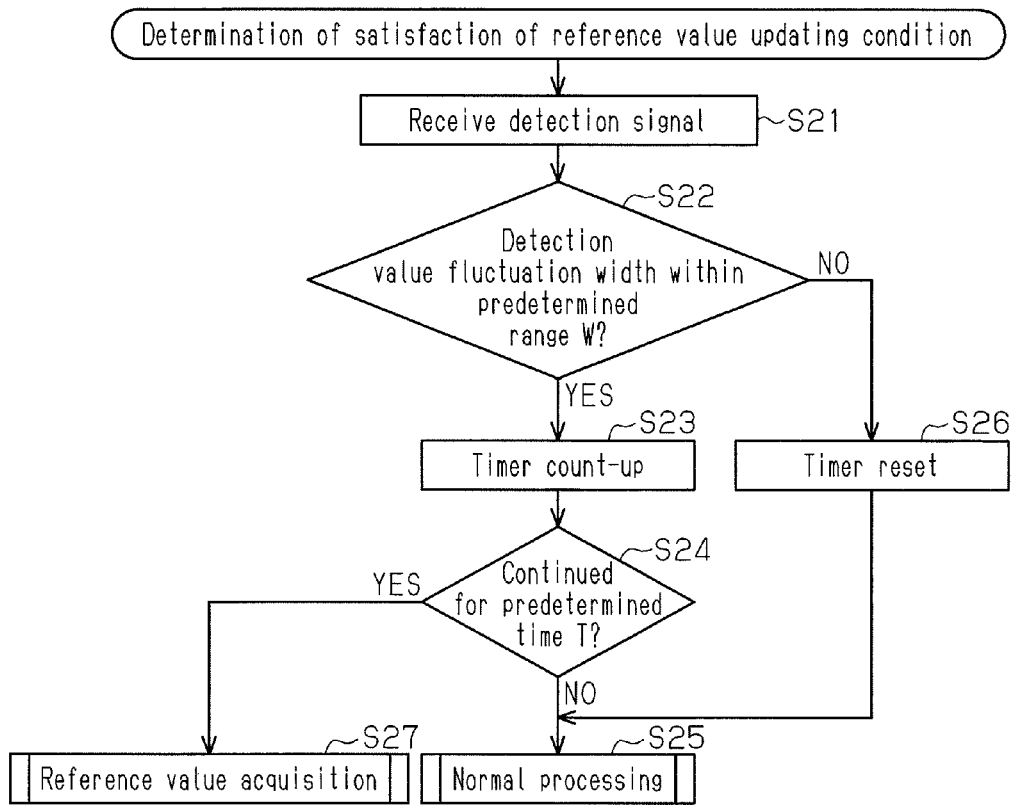
FIG. 6 is a flowchart showing the procedures for updating the reference value in the first embodiment.

As shown in FIG. 6, when the control unit 24 receives the detection value of the capacitance of each capacitor C from the detection unit 23 (step S21), the control unit 24 determines whether or not the fluctuation width of the detection values is within the predetermined range W (step S22). More specifically, the control unit 24 determines whether or not the fluctuation width in the raw data values or the control data values is within the predetermined range W. The predetermined width W is smaller than the touch determination threshold value used to detect touching and is, for example, one-tenth of the touch determination value or smaller. For example, the fluctuation width of the detection values would be within the predetermined range W under a situation in which the capacitances of the operation surface 11a does not change when the user touches the operation surface 11a, when there is external noise, or when a foreign matter exists on the operation surface 11a.

When the control unit 24 determines that the fluctuation width of the detection values is larger than the predetermined range W (step S22: NO), the control unit 24 resets a timer (step S26) and proceeds to step S25. The timer is arranged in, for example, the control unit 24.

When the control unit 24 determines that the fluctuation width of the detection values is within the predetermined range W (step S22: YES), the control unit 24 performs a count-up with the timer (step S23). The predetermined time T is, for example, twenty seconds, and is the time a situation in which the fluctuation width is within the predetermined range would not continue as long as normal touching is performed. The control unit 24 determines whether or not a situation in which the fluctuation width is within the predetermined range W has continued for the predetermined time T (step S24).

When the control unit 24 determines that a situation in which the fluctuation width is within the predetermined range W has not continued for the predetermined time T (step S24: NO), the control unit 24 determines that there is no need to update the reference value (initial reference value or control reference value). That is, when the fluctuation width of the detection values exceeds the predetermined range W, the touching, external noise, and/or foreign matter are being properly detected. Thus, the control unit 24 does not update the reference value and performs the normal processing in step S103 or S104 (step S25).

When the control unit 24 determines that a situation in which the fluctuation width is within the predetermined range W has continued for the predetermined time T (step S24: YES), the control unit 24 determines that the reference value is erroneous and shifts to an initial setting state (step S100) to perform a reference value acquisition process (step S27). Then, the control unit 24 updates the control reference value based on a detection signal output from the detection unit 23. In the first embodiment, the control unit 24 determines whether or not the reference value needs to be updated for each intersection (capacitor C) in the sensor array 14. Accordingly, the control unit 24 is able to determine with high accuracy whether or not there is an error in the reference value, which is used to detect changes in the capacitance.

Figure 7:
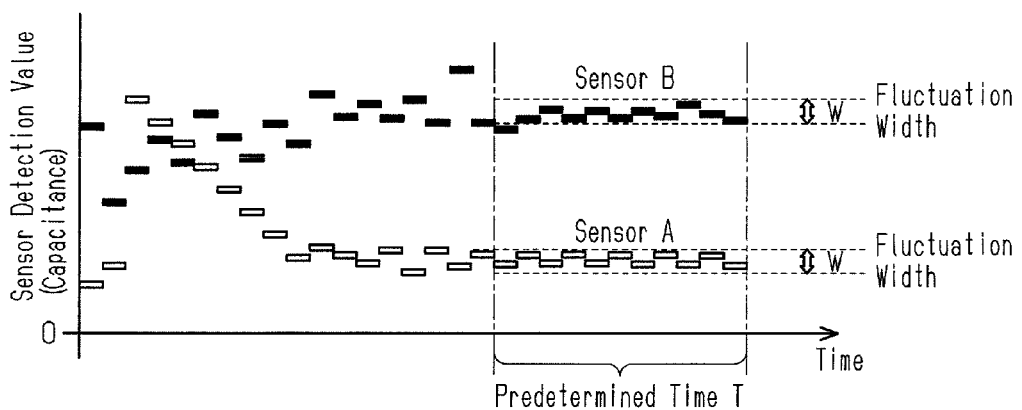
FIG. 7 is a graph showing the condition for updating the reference value.

A case in which touching of the operation surface 11a is detected when one of the reference values is erroneous in the touch-type input device 10 will now be described with reference to FIG. 7. The sensor detection values shown in FIG. 7 are capacitances of capacitors C at the intersections of the sensor array 14 and indicate change amounts of the capacitances from the corresponding control reference values. In this example, two capacitors C (sensors A and B) will be described.

As shown in FIG. 7, with regard to sensor A, a situation in which the fluctuation width of the detection value is within the predetermined width W continues for the predetermined time T. In this case, the control unit 24 determines that the control reference value is erroneous. As for sensor B, a situation in which the fluctuation width of the detection value is within the predetermined width W does not continue for the predetermined time T. Accordingly, the control unit 24 determines that touching of the operation surface 11a by the user, external noise, or foreign matter has been detected at the location corresponding to sensor B.

Figure 8:
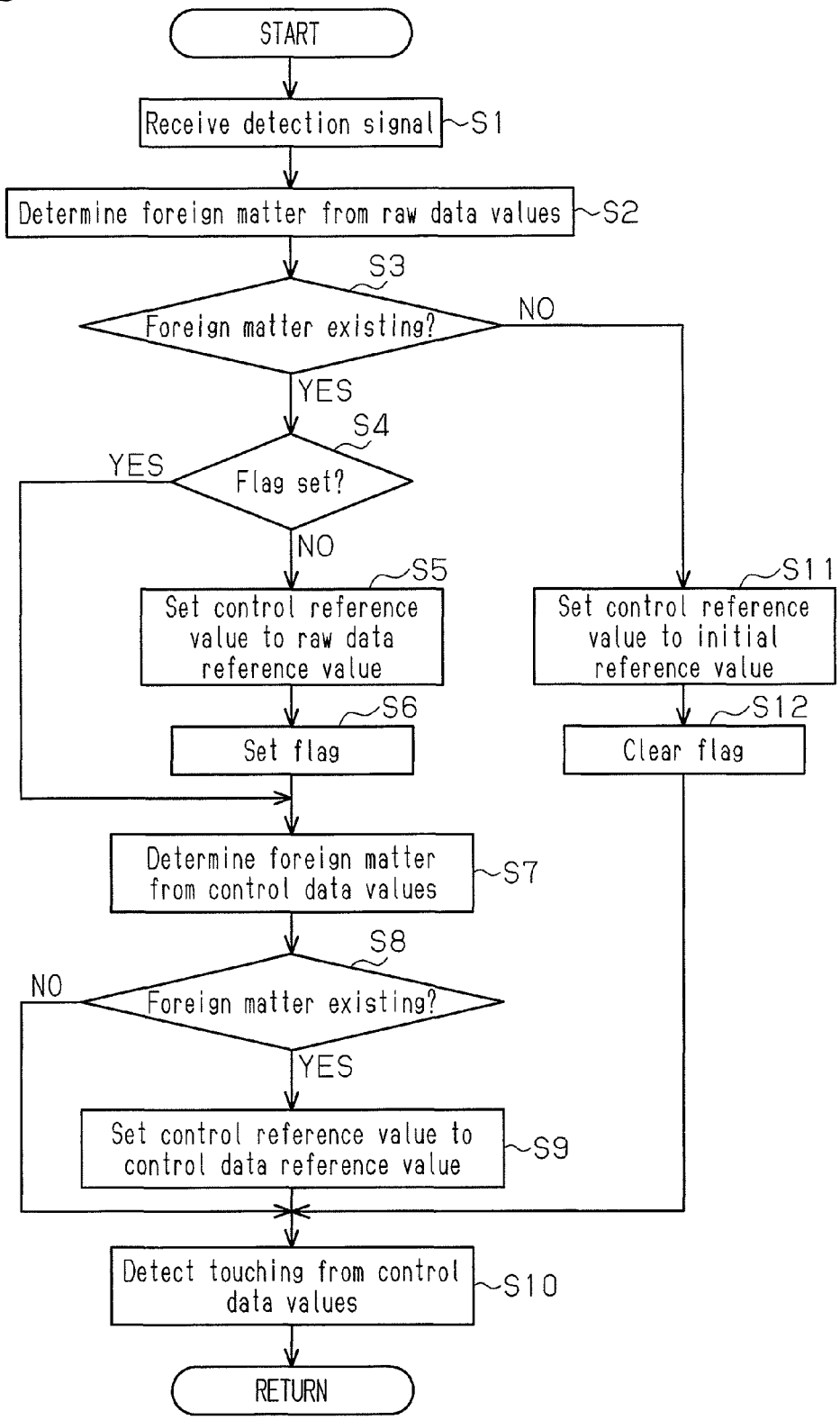
FIG. 8 is a flowchart showing the procedures for detecting touching of the touch panel.

The procedures taken by the control unit 24 to detect touching of the touch panel 11 will now be described with reference to the flowchart of FIG. 8. The control unit 24 executes the detection process in predetermined sampling cycles (detection cycles) to detect touching of the touch panel 11.

When the control unit 24 receives a detection signal from the detection unit 23 (step S1), the control unit 24 determines from the raw data values whether or not a conductive foreign matter exists on the operation surface 11a (step S2). When the control unit 24 determines that a foreign matter exists on the operation surface 11a (step S3: YES), the control unit 24 determines whether or not a flag is set to indicate that the control reference value differs from the initial reference value (step S4). The flag is stored in the memory 24a. When the flag is not set (step S4: NO), the control unit 24 sets the control reference value to the raw data reference value for each capacitor C (step S5) and sets the flag (step S6).

Then, the control unit 24 determines from the control data values whether or not a conductive foreign matter exists on the touch panel 11 (step S7). When the flag is set (step S4: YES), the control unit 24 skips steps S5 and S6 and proceeds to step S7 to perform a foreign matter determination based on the control data values. When the control unit 24 determines that another foreign matter exists on the operation surface 11a (step S8: YES), the control unit 24 sets the control reference value to the control data reference value for each capacitor C (step S9). Then, the control unit 24 detects whether or not the touch panel 11 has been touched based on the control data values (step S10). When the control unit 24 determines from the control data values that there is no foreign matter on the operation surface 11a (step S8: NO), the control unit 24 skips step S9 and proceeds to step S10 to detect touching of the touch panel 11 from the control data values.

When the control unit 24 determines from the raw data values that there is no foreign matter on the operation surface 11a (step S3: NO), the control unit 24 sets the control reference value to the initial reference value (step S11) and clears the flag (step S12). Then, the control unit 24 proceeds to step S10 and detects touching of the touch panel 11 from the control data values.

The detection of a touch when a foreign matter is contacting the operation surface 11a of the touch panel 11 will now be described with reference to FIGS. 9A to 10C.

Figure 9A:
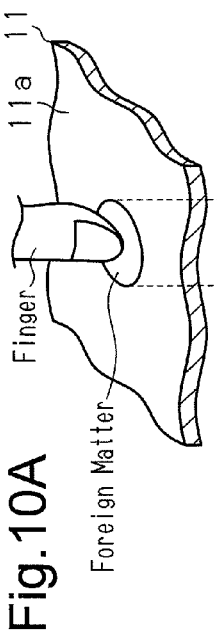
FIG. 9A is a schematic diagram showing the touch panel when a conductive foreign matter is contacting the operation surface.
Figure 9B:
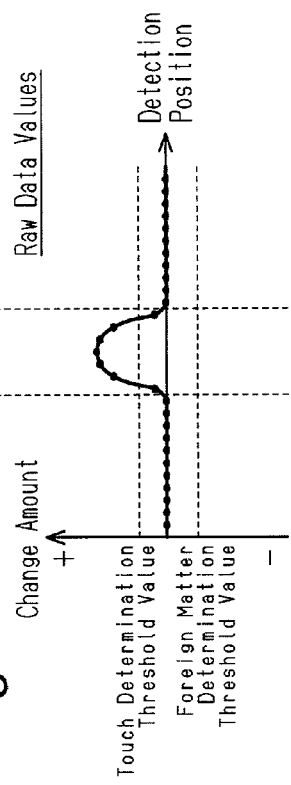
FIG. 9B is a graph plotted from raw data values taken under the condition shown in FIG. 9A.

Referring to FIG. 9A, when a foreign matter contacts the operation surface 11a of the touch panel 11, the raw data values (capacitances of capacitors C) in the area contacting the foreign matter are changed to negative values, as shown in FIG. 9B. Further, the raw data values around the foreign matter are changed to positive values. When each control reference value is set to the initial reference value, the control data values would be the same as the raw data values as shown by the double-dashed line in FIG. 6C. To facilitate understanding, FIGS. 9B and 9C use dots to show the raw data values and the control data values obtained along a single line (X direction) extending through the foreign matter. When a foreign matter exists on the operation surface 11a as shown in FIG. 9A, at least one of the raw data values is less than or equal to the foreign matter determination threshold value. Accordingly, the control unit 24 determines that a foreign matter exists on the operation surface 11a and sets each control reference value to the raw data reference value, that is, the same value as the capacitance corresponding to the present raw data value. When the capacitance of each capacitor C is newly obtained under this situation, as shown by the bold line in FIG. 9C, the control data value would be zero. Accordingly, if the touch panel 11 is touched under a situation in which a foreign matter exists on the operation surface 11a, the control data values obtained from the area touched by a finger change to positive values. This allows for touching of the touch panel 11 to be correctly detected.

Figure 9C:
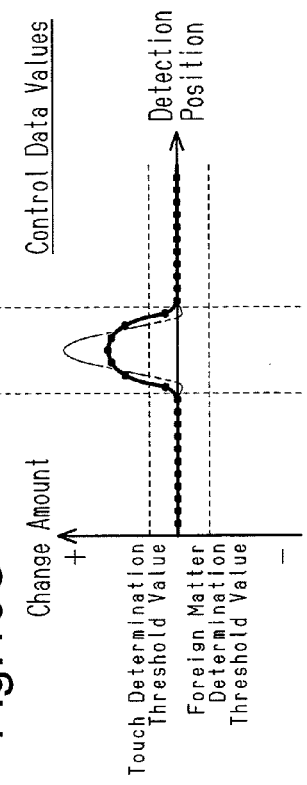
FIG. 9C is a graph plotted from control data values taken under the condition shown in FIG. 9A.

Under the situation shown in FIG. 9A, when another foreign matter (not shown) contacts the operation surface 11a, the control data values change, for example, as shown by the double-dashed line shown in FIG. 9C. Accordingly, the control unit 24 determines from the control data values that another foreign matter exists on the operation surface 11a and sets each control data reference value to the control data value, that is, the same value as the capacitance corresponding to the present control data value. When the capacitance of each capacitor C is newly obtained under this situation, as shown by the bold line in FIG. 9C, the control data value is zero. Accordingly, if the touch panel 11 is touched when a foreign matter exists on the operation surface 11a, the control data values obtained from the area touched by a finger change to positive values. This allows for touching of the touch panel 11 to be correctly detected.

Figure 10A:
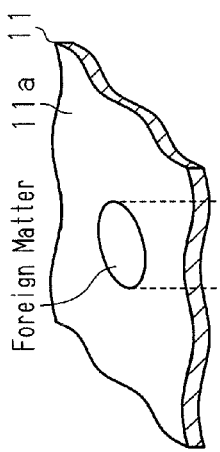
FIG. 10A is a schematic diagram showing the touch panel when a finger touches a conductive foreign matter on the operation surface.
Figure 10B:
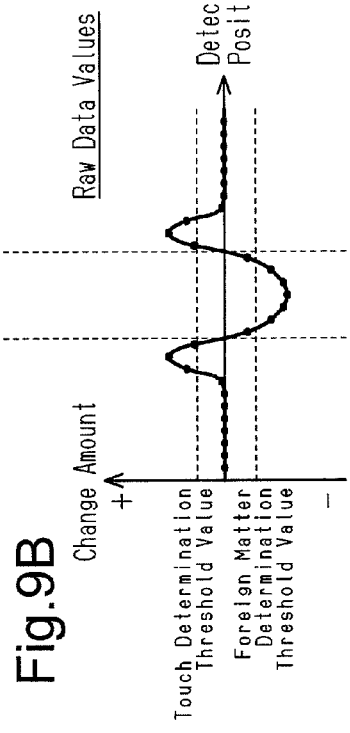
FIG. 10B is a graph plotted from raw data values taken under the condition shown in FIG. 10A.
Figure 10C:
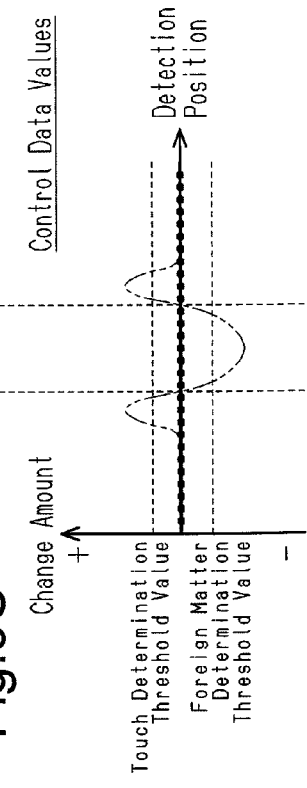
FIG. 10C is a graph plotted from control data values taken under the condition shown in FIG. 10A.

FIG. 10A shows a situation in which a finger contacts a foreign matter on the operation surface 11a. In this case, as shown in FIG. 10B, the raw data values in the area in which the finger and the foreign matter are located change to positive values. In other words, the raw data values change in substantially the same manner as when a large finger touches the operation surface 11a. Under the situation shown in FIG. 10A, the raw data values are greater than the foreign matter threshold value. Accordingly, the control unit 24 determines from the raw data values that there is no foreign matter on the operation surface 11a and sets each control reference value to the initial reference value (refer to step S11 in FIG. 8). Consequently, as shown by the bold line in FIG. 10C, the newly acquired control data values each show the amount of change in the capacitance of the corresponding capacitor C from the initial reference value. That is, the control data values are the same as the raw data values. If the control reference values have been set to the raw data reference values, the control data values would be as shown by the double-dashed line in FIG. 10C.

The first embodiment has the advantages described below.

(1) When the control unit 24 determines from the raw data values that a conductive foreign matter exists on the operation surface 11a, the control unit 24 sets the control reference values to the raw data reference values corresponding to the raw data values. The control data values acquired from the raw data reference values indicate the change amounts of the capacitances of the capacitors C from when a foreign matter contacts the operation surface 11a. This allows the control unit 24 to accurately recognize changes in the capacitances of the capacitors C and correctly detect when a finger or the like touches the operation surface 11a even if a foreign matter is contacting the operation surface 11a. Further, the control unit 24 updates the initial reference value when activated. Thus, the control unit 24 acquires reference values corresponding to changes in the electrostatic capacitance (parasitic capacitance) caused by wear or the ambient environment such as the temperature. As a result, touching of the operation surface 11a is detected based on appropriate reference values. However, the reference values acquired or updated when the control unit 24 is activated may be erroneous. In this case, when determining that a control reference value is erroneous, the control unit 24 updates the control reference value and correctly detects touching of the operation surface 11a.

(2) When a situation in which the fluctuation width of the control data values, which indicate the change amounts of capacitances from the control reference values, is within the predetermined range W continues for the predetermined time T, for example, an erroneous control reference value may be acquired when touching or external noise is detected or a foreign matter may be contacting the operation surface 11a. In this case, the control unit 24 determines that the control reference value is erroneous and updates the control reference value. This allows touching of the operation surface 11a to be correctly detected.

(3) The existence of a foreign matter is determined from the control data values. Thus, after a certain time from when determining contact of the foreign matter with the operation surface 11a, the control unit 24 is able to determine whether or not a further foreign matter is contacting the operation surface 11a. When the control unit 24 determines from the control data values that there is a foreign matter on the operation surface 11a, new control reference values are set to control data reference values corresponding to the present control data values. The control data values newly acquired from the control data reference values indicate the change amounts of the capacitances of the capacitors C from a situation in which more than one foreign matter is contacting the operation surface 11a. In this manner, even when more than one foreign matter is contacting the operation surface 11a, the control unit 24 is able to accurately recognize changes in the capacitances of the capacitors and correctly detect when a finger or the like touches the operation surface 11a.

Second Embodiment

Figure 11:
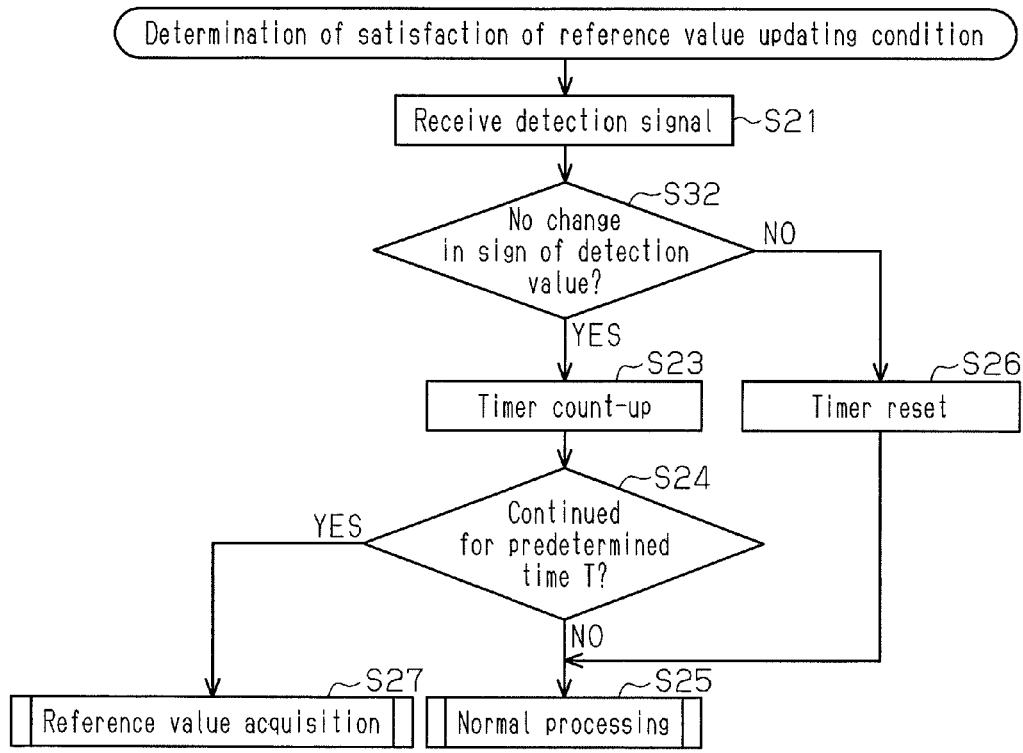
FIG. 11 is a flowchart showing the procedures for updating the reference value in a second embodiment.

A second embodiment of the touch-type input device 10 will now be described with reference to FIGS. 11 and 12. The touch-type input device 10 of the second embodiment differs from that of the first embodiment in the reference value updating condition. Otherwise, the touch-type input device 10 of the second embodiment is the same as the first embodiment (refer to FIG. 4). The description hereafter will focus on the differences from the first embodiment.

Referring to FIG. 5, the control unit 24 determines whether or not the reference values need to be updated in each of the touch OFF state (step S102), the noise and abnormality detection state (step S103), and the touch ON state (step S104). When the reference value updating condition is satisfied, the control unit 24 proceeds to the initial setting state (step S100). The reference value updating condition is the determination that a reference value includes an error. In the second embodiment, the operation surface 11a of the touch panel 11 is divided into a plurality of detection areas (sensor areas). Each detection area includes one or more sensors (capacitors C). The control unit 24 determines from the control data values whether or not the operation surface 11a has been touched. When the location of the touched detection area does not shift over a predetermined time T, the control unit 24 determines that the control reference value is erroneous and updates the reference values.

The procedures taken by the control unit 24 to update the reference values will now be described with reference to FIG. 11. When the control unit 24 receives the detection value of the capacitance of each capacitor C from the detection unit 23 (step S21), the control unit 24 determines whether or not the sign of a detection value has changed (step S32). In other words, the control unit 24 determines whether or not the signs of the control data values have changed. When changes are detected in the capacitances (control data value) but the signs of the control data value do not change over the predetermined time T, the set control reference values may be erroneous. A change in the sign of a control data value may be in a direction that is the same as when a finger (touching) is operated or in an opposite direction.

When the control unit 24 determines that the signs of the control data values have changed (step S32: NO), the control unit 24 resets the timer (step S26) and proceeds to step S25.

When the control unit 24 determines that the signs of the control data values have not changed (step S32: YES), the control unit 24 performs a count-up with the timer (step S23). Then, the control unit 24 determines whether or not a situation in which signs of the control data values do not change has continued for a predetermined time T (step S24).

When a situation in which signs of the control data values do not change does not continue for the predetermined time T, that is, when determining that the location of the touched detection area has shifted (step S24: NO), the control unit 24 determines that there is no need to update the control reference values. In this case, touching, external noise, and/or foreign matter are being properly detected. Thus, the control unit 24 does not update the control reference values and performs normal processing in step S103 or S104 (step S25).

When a situation in which signs of the control data values do not change has continued for a predetermined time T, that is, when determining that the location of the touched detection area has not shifted (step S24: YES), the control unit 24 determines that the reference values include an error and proceeds to the initial setting state (step S100) to perform a reference value acquisition process (step S27). Then, the control unit 24 updates the control reference values based on the detection signals output from the detection unit 23. In the second embodiment, the control unit 24 determines whether or not the signs of the control data values have changed for each detection area. This reduces the processed amount of data compared to when determining whether or not the reference value needs to be updated for each intersection (capacitor C) in the sensor array 14.

A case in which touching is directed when the touch-type input device 10 includes an error will now be described with reference to FIG. 12. The operation surface 11a of the touch panel 11 is divided to form a grid-shaped pattern of detection areas (sensor areas). The detection areas where touching is detected are indicated by dots and diagonal lines.

Figure 12:
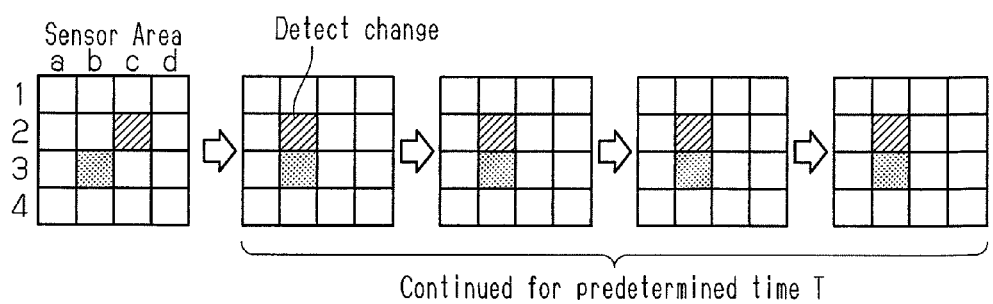
FIG. 12 is a graph showing the conditions for updating a control reference value.

As shown in FIG. 12, in sensor area 3b, a situation in which the signs do not change in the control data value continues for the predetermined time T. Thus, the control unit 24 determines that the control reference values in sensor area 3b include an error. In sensor area 2c, the signs change in the control data value. Thus, the control unit 24 determines that the control reference values in sensor area 2c do not include an error.

In addition to advantages (1) and (3) of the first embodiment, the second embodiment has the advantages described below.

(4) In the detection areas (sensor areas) obtained by dividing the operation surface 11a, if the location of the touched detection area does not shift over the predetermined time T, erroneous reference control values may have been acquired when touching or external noise was detected in that area or a foreign matter may be contacting that detection area. In this case, the control unit 24 determines that the control reference values in the detection area include an error and updates the control reference values. This allows for correct detection of touching of the operation surface 11a.

It should be apparent to those skilled in the art that the present invention may be embodied in many other specific forms without departing from the spirit or scope of the invention. Particularly, it should be understood that the present invention may be embodied in the following forms.

In each of the above embodiments, the control unit 24 shifts to the initial setting state (step S100) when the reference value updating condition is satisfied in each of the touch OFF state (step S102), the noise and foreign matter detection state (step S103), and the touch ON state (step S104). However, the control unit 24 may shift to the initial setting state when the reference value updating condition is satisfied only in, for example, the touch ON state. Alternatively, the control unit 24 may shift to the initial setting state when the reference value updating condition is satisfied only in the touch OFF state. As another option, the control unit 24 may shift to the initial setting state when the reference value updating condition is satisfied only in the noise and foreign matter detection state.

In each of the above embodiments, the control unit 24 may be configured not to perform foreign matter determination based on the control data values. More specifically, steps S7 to S9 may be omitted from the flowchart of FIG. 8. In this case, whenever the control unit 24 determines from the raw data values that a foreign matter exists, the control reference value for each capacitor C may be set to the raw data reference value corresponding to the present raw data.

In each of the above embodiments, the control unit 24 determines that a foreign matter exists when at least one of the raw data values is less than or equal to the foreign matter determination threshold value. For example, the control unit 24 may determine that a foreign matter exists when at least one of the raw data values is less than or equal to the foreign matter determination threshold value and, at the same time, at least one of the negative raw data values is greater than or equal to the threshold value. In the same manner, foreign matter determination may be performed based on the control data values under other conditions. The same applies to the touching detection, and touching may be detected when a condition that is satisfied is one other that at least one of the control data values being greater than or equal to the touch determination threshold.

In each of the above embodiments, the raw data reference values are set to be the same as the raw data values taken when determining that a foreign matter is in contact with the operation surface 11a. However, the raw data reference values do not have to be values that are completely the same as the raw data values as long as they correspond to the control data values. Further, the initial reference values do not have to be values that are completely the same as the capacitances when there is no object contacting the operation surface 11a.

The present examples and embodiments are to be considered as illustrative and not restrictive, and the invention is not to be limited to the details given herein, but may be modified within the scope and equivalence of the appended claims.

The invention claimed is:

1. A touch-type input device comprising:
a touch panel including a sensor array and an operation surface, wherein the sensor array includes drive electrodes and sensor electrodes insulated from and stacked on the drive electrodes, and wherein the drive electrodes and the sensor electrodes are arranged in a grid-shaped pattern that provides capacitors at intersections of the drive electrodes and the sensor electrodes; and
a controller that applies a drive signal to the drive electrodes and detects touching of the operation surface of the touch panel from changes in a capacitance of each capacitor, wherein the controller is configured so that:
the controller determines whether or not a conductive foreign matter exists on the operation surface from raw data values, each indicating a change amount in the capacitance of each capacitor from an initial reference value that is set in advance for each capacitor;
the controller determines whether or not the operation surface has been touched from control data values, each indicating a change amount in the capacitance of each capacitor from a control reference value that is changed for each capacitor in accordance with whether or not the conductive foreign matter exists;
when the controller determines from the raw data values that the conductive foreign matter exists on the operation surface, the controller determines whether or not a flag is set to indicate that the control reference value differs from the initial reference value;
when the flag is not set, the controller sets the control reference value of each capacitor to a raw data reference value corresponding to one of the raw data values and sets the flag;
when the flag is set, the controller determines from the control data values whether or not a further conductive foreign matter exists on the operation surface;
when the controller determines from the control data values that the further conductive foreign matter exists on the operation surface, the controller sets the control reference value of each capacitor to a control data reference value corresponding to one of the control data values;
when the controller determines from the control data values that the further conductive foreign matter does not exist on the operation surface, the controller sets the control reference value of each capacitor to the raw data reference value corresponding to the capacitor;
when the controller determines from the raw data values that the conductive foreign matter does not exist on the operation surface, the controller sets the control reference value of each capacitor to the initial reference value and clears the flag;
the controller updates the initial reference value to a new initial reference value, when the touch-type input device is activated, to correctly determine whether or not the operation surface has been touched; and
the controller updates the control reference value to the control data, reference value
when a situation in which a fluctuation width of the control data values is within a predetermined width continues for a predetermined time, or
when a location of a detection area that is touched does not shift over the predetermined time, wherein the detection area is one of a plurality of detection areas that are divided in the operation surface of the touch panel.

* * * * *